United States Patent
Zambito

(10) Patent No.: US 9,855,827 B1
(45) Date of Patent: Jan. 2, 2018

(54) MOTOR VEHICLE WINDOW VISIBILITY SYSTEM AND METHOD

(71) Applicant: Joseph Zambito, Cleveland, TX (US)

(72) Inventor: Joseph Zambito, Cleveland, TX (US)

(*) Notice: Subject to any disclaimer, the term of this patent is extended or adjusted under 35 U.S.C. 154(b) by 10 days.

(21) Appl. No.: 15/155,050

(22) Filed: May 15, 2016

Related U.S. Application Data

(60) Provisional application No. 62/197,505, filed on Jul. 27, 2015.

(51) Int. Cl.

| | | |
|---|---|---|
| *B60J 3/00* | (2006.01) | |
| *G02B 27/00* | (2006.01) | |
| *G02F 1/00* | (2006.01) | |
| *B60J 1/00* | (2006.01) | |
| *B60J 3/06* | (2006.01) | |
| *G02F 1/01* | (2006.01) | |
| *B32B 17/10* | (2006.01) | |
| *B60J 3/04* | (2006.01) | |

(52) U.S. Cl.
CPC ......... *B60J 3/007* (2013.01); *B32B 17/10036* (2013.01); *B32B 17/10357* (2013.01); *B32B 17/10486* (2013.01); *B60J 1/002* (2013.01); *B60J 3/04* (2013.01); *B60J 3/06* (2013.01); *G02B 27/00* (2013.01); *G02F 1/0126* (2013.01); *B32B 17/10302* (2013.01); *B32B 2250/02* (2013.01); *B32B 2255/26* (2013.01); *B32B 2307/408* (2013.01); *B32B 2307/4023* (2013.01); *B32B 2307/412* (2013.01); *B32B 2307/42* (2013.01); *B32B 2605/08* (2013.01)

(58) Field of Classification Search
CPC .... B60J 3/007; B60J 3/04; G02B 5/08; G02B 5/0841; G02B 27/00; B32B 17/10036; B32B 17/10064; B32B 17/1011; B32B 17/10174; B32B 17/10302; B32B 17/10339; B32B 17/10486; B32B 17/10513; B32B 17/10761; B32B 27/08; B32B 2605/00; B32B 2605/006
USPC ............... 359/241, 265, 267, 275, 601, 603
See application file for complete search history.

(56) References Cited

U.S. PATENT DOCUMENTS

| | | | |
|---|---|---|---|
| 3,466,181 A | | 9/1969 | Allison |
| 4,893,908 A | * | 1/1990 | Wolf ..................... G02F 1/1533 359/275 |
| 5,115,346 A | | 5/1992 | Lynam |
| 5,239,406 A | * | 8/1993 | Lynam .................. B32B 17/10 296/215 |
| 5,355,245 A | * | 10/1994 | Lynam .................. B32B 17/10 359/267 |
| 5,680,245 A | * | 10/1997 | Lynam .................. B32B 17/10 359/265 |
| 5,986,797 A | * | 11/1999 | Lynam .................. B32B 17/10 359/265 |
| 6,122,093 A | * | 9/2000 | Lynam .................. B32B 17/10 359/265 |

(Continued)

*Primary Examiner* — Loha Ben
(74) *Attorney, Agent, or Firm* — RG Patent Consulting, LLC; Rachel Gilboy

(57) ABSTRACT

An improved motor vehicle window visibility system that increases visibility and provides low-glare for a windshield and windows of a motor vehicle, improves temperature control, improves visual contrast and reduces glare in bright sunlight, rain, sleet, snow, fog, and night conditions. The system includes a thin polymeric film, yellow-tinted, that sandwiches and seals between layers of clear laminated glass of the motor vehicle.

20 Claims, 5 Drawing Sheets

(56) References Cited

U.S. PATENT DOCUMENTS

| | | | | |
|---|---|---|---|---|
| 6,304,363 B1 * | 10/2001 | Lynam | ................... | B32B 17/10 |
| | | | | 359/265 |
| 6,450,652 B1 | 9/2002 | Karpen et al. | | |
| 6,819,467 B2 * | 11/2004 | Lynam | ................... | B32B 17/10 |
| | | | | 359/265 |
| 8,599,466 B2 * | 12/2013 | Agrawal | ................ | B60R 1/088 |
| | | | | 359/265 |

* cited by examiner

MOTOR VEHICLE WINDOW VISIBILITY SYSTEM AND METHOD

CROSS-REFERENCE TO RELATED APPLICATION

The present application is related to and claims priority from prior provisional application Ser. No. 62/197,505, filed Jul. 27, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of glare reducing window tint and more specifically relates to a high-visibility, low-glare, tinted film to equip the windshields and windows of motor vehicles with while offering motorists the many advantages of tinted windows—a cooler interior, more privacy, better UV protection—and most importantly, better visual contrast and reduced glare in difficult conditions ranging from bright sunlight to rain, sleet, snow, fog, and night.

2. Description of the Related Art

Consider that there are more than 250 million cars, vans, SUVs, and pickups registered for use on America's roads and highways, and more than three million trucks. And for all the safety equipment that these vehicles possess, in one respect they remain sadly unequipped—unequipped for combating a serious hazard that every driver faces. That hazard is glare: glare from the sun, from the roadway, from the headlights of other vehicles at night. And when we are momentarily blinded by glare when driving, a lot of things can happen fast—none of them good. What all drivers need, then, is a means of combating glare far more effective than a vehicle's sun-visors. We need the windshield itself to function like a pair of high-quality, glare-cutting driving glasses—and that is exactly what the invention to be presented here would do.

Various attempts have been made to solve problems found in glare reducing window tint art. Among these are found in: U.S. Pat. No. 6,450,652 to Harvey B Hiteshew; U.S. Pat. No. 5,115,346 to Niall R. Lynam; and U.S. Pat. No. 3,466,181 to Kenneth C. Allison et al. This prior art is representative of glare reducing window tint.

None of the above inventions and patents, taken either singly or in combination, is seen to describe the invention as claimed. Thus, a need exists for a reliable a high-visibility, low-glare, tinted film to equip the windshields and windows of motor vehicles with while offering motorists the many advantages of tinted windows—a cooler interior, more privacy, better UV protection—and most importantly, better visual contrast and reduced glare in difficult conditions ranging from bright sunlight to rain, sleet, snow, fog, and night and to avoid many or all the above-mentioned problems, processes, or parts.

BRIEF SUMMARY OF THE INVENTION

In view of the foregoing disadvantages inherent in the known glare reducing window tint art, the present invention provides a novel motor vehicle window visibility system, i.e., Z Ray technology, Z Ray, Z Ray glass, or the like. The general purpose of the present invention, which will be described subsequently in greater detail, is to provide a high-visibility, low-glare, tinted film to equip windshields and windows of motor vehicles with while offering motorists many advantages of tinted windows—a cooler interior, more privacy, better UV protection—and most importantly, better visual contrast and reduced glare in difficult conditions ranging from bright sunlight to rain, sleet, snow, fog, and night.

An improved motor vehicle window visibility system that increases visibility and provides low-glare for a windshield and windows of a motor vehicle, improves temperature control, improves visual contrast and reduces glare in bright sunlight, rain, sleet, snow, fog, and night conditions. The improved system includes a thin polymeric film, yellow-tinted, that sandwiches and seals between layers of clear laminated glass of the motor vehicle.

An improved motor vehicle window visibility method that increases visibility and provides low-glare for a windshield and windows of a motor vehicle, and improves visual contrast and reduces glare in bright sunlight, rain, sleet, snow, fog, and night conditions. The improved method step(s) include installing a thin polymeric film, yellow-tinted, that sandwiches and seals between layers of clear laminated glass of the motor vehicle.

The present invention holds significant improvements and serves as an improved motor vehicle window visibility system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an improved motor vehicle window visibility system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an improved motor vehicle window visibility system including a glare reducing window tint, i.e., Z Ray technology. The glare reducing window tint that includes a high-visibility, low-glare, tinted film to equip the windshields and windows of motor vehicles with while offering motorists the many advantages of tinted windows. Some advantages of tinted windows include having a cooler interior, more privacy, better UV protection, and most importantly, better visual contrast and reduced glare in difficult conditions ranging from bright sunlight to rain, sleet, snow, fog, and night.

Generally speaking, Z Ray technology consists of, in one example, a thin polymeric film, yellow-tinted, that would be sandwiched and sealed between layers of clear laminated glass. For instance, this yellow and/or amber tint would provide superior contrast and enhanced visibility in snow, fog, rain, sleet, and sunlight, while blocking Ultra Violet (UV) light and eliminating glare.

Figure 1:
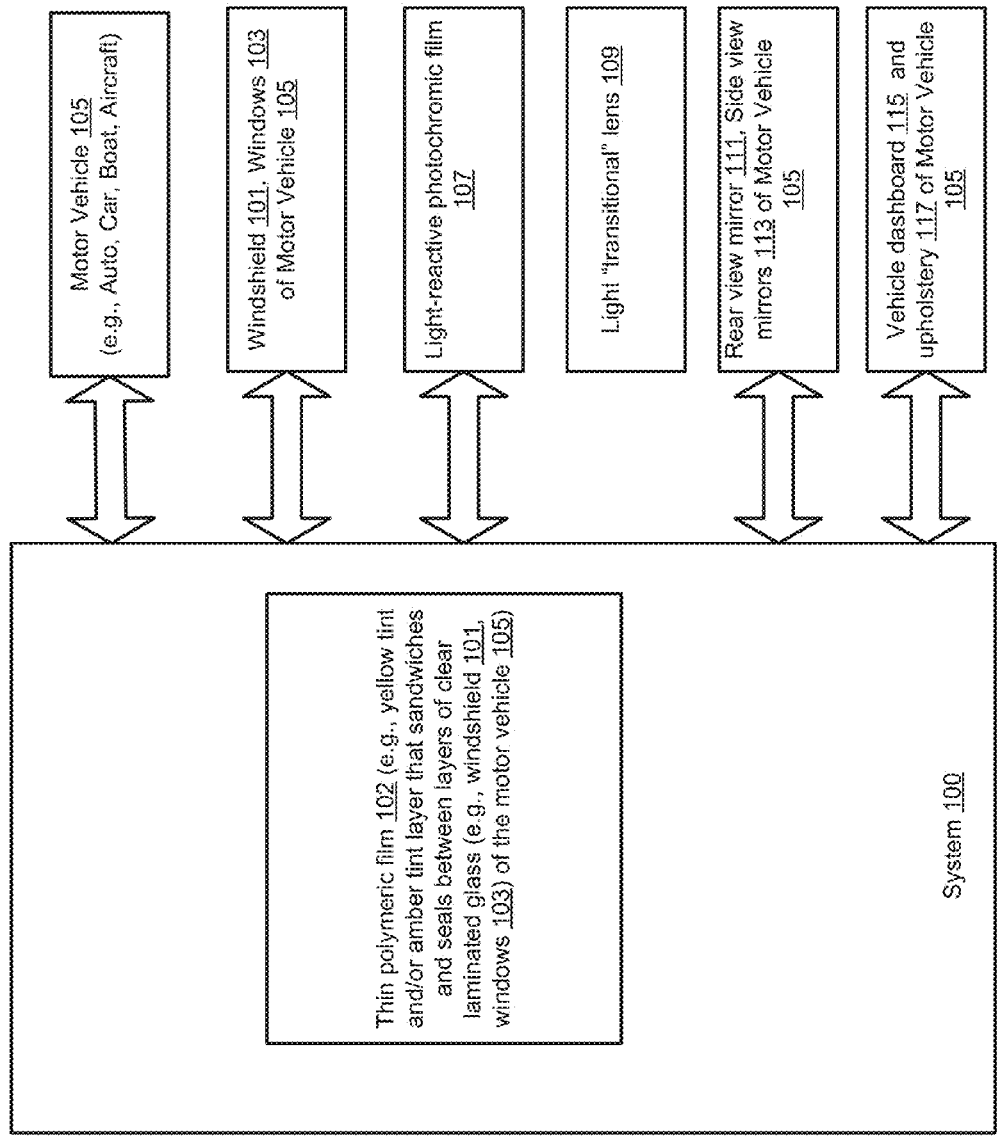
FIG. 1 shows a block diagram view illustrating an improved motor vehicle window visibility system according to an embodiment of the present invention.

FIG. 1 shows a block diagram view illustrating an improved motor vehicle window visibility system according to an embodiment of the present invention.

Referring to the drawings by numerals of reference there is shown in FIG. 1, an improved motor vehicle window visibility system 100 is disclosed that increases visibility and provides low-glare for a windshield 101 and windows 103 of a motor vehicle 105. Advantageously, this system 100 improves temperature control and visual contrast and reduces glare in bright sunlight, rain, sleet, snow, fog, and night conditions. The improved system 100 includes a thin polymeric film 102.

In some embodiments, the thin polymeric film 102 may be processed using any or all the following: RF or DC sputtering, electron beam evaporation, or chemical vapor deposition, for example, between or onto one or more layers of clear laminated glass of the motor vehicle 105. In some embodiments, the thin polymeric film 102 includes a thin film PET or PVC material that is incorporated or deposited between or onto one or more layers of clear laminated glass of the motor vehicle 105. In some embodiments, the thin film polymeric film 102 has an approximate thickness range of 0.5 mils to 3 mils. In one example, the thin polymeric film 102 is yellow-tinted that improves contrast and enhances visibility in bright sunlight, rain, sleet, snow, fog, and night conditions when incorporated or deposited, for example, between one or more layers of clear laminated glass of the motor vehicle 105. In one example, the thin polymeric film 102 sandwiches and seals between layers of the clear laminated glass of the motor vehicle 105. In some embodiments, the thin polymeric film 102 further includes an amber tint to further improve contrast and enhance visibility in bright sunlight, rain, sleet, snow, fog, and night conditions.

In some embodiments, the thin polymeric film 102 is installed and incorporated into a design and a production between the layers of clear laminated glass for the windshield 101 and/or the windows 103 of the motor vehicle 105. In some embodiments, the thin polymeric film 102 is installed and incorporated into a production of light-reactive, photochromic film 104 between the layers of the clear laminated glass of the windshield 101 and/or the windows 103 of the motor vehicle 105. In some embodiments, the thin polymeric film 102 includes a light-reactive photochromic film 107 that darkens in response to a bright light and lightens in response to low levels of light. For example, the photochromic film 107 includes inorganic/organic optical films such as those produced by NDFOS or Glory Chemical. In some embodiments, the thin polymeric film 102 is installed and incorporated with a light "transitional" lenses 109 between the layers of the clear laminated glass of the windshield. For example, the light "transitional" lenses 109 includes materials such as those found in 1.56 photochromic film semi blue lens fast transition resin optical lenses sold by Natwve & Co from Zhejiang China (Mainland).

In some embodiments, the thin polymeric film 102 is installed and incorporated between the layers of the clear laminated glass of at least one of rear view mirror 111 and side view mirrors 113 of the motor vehicle 105. In some embodiments, the thin polymeric film 102 is disposed and positioned with the windshield 101 or the windows 103 to hold shattering laminated glass together to increase occupant safety within the motor vehicle 105 in event of a shattering during a car crash or a window breaking of the windshield 101 and/or the windows 103.

In some embodiments, the thin polymeric film 102 effectively blocks a vast majority of potentially harmful UV rays in a sunlight and prevents occupants' skin damage and a wide range of natural and synthetic materials including a vehicle's dashboard 115 and a vehicle's dashboard upholstery 117. In some embodiments, the motor vehicle 105 includes a boat and an aircraft and wherein the thin polymeric film 102 provides temperature control for an interior of the motor vehicle 105 so the motor vehicle remains cooler on hot days and cuts down on glare and heat.

As such, Z Ray technology discloses a novel product offering consumers a practical solution to the aforementioned challenges. As the name implies, the Z Ray technology preferably offers motorists (as well as the automakers and the windshield manufacturers who supply them) a unique type of laminated automotive glass designed to provide optimal visibility and dramatic glare-reduction in all road conditions, and suitable for use in windshields, windows, and rear glass.

Furthermore, Z Ray technology non-glare tint would be equally effective for enhancing visibility and reducing glare for both day and night driving. As such, Z Ray technology could be incorporated into the design and production of any automotive windshield. Furthermore, Z Ray technology is employable in the production of light-reactive, photochromic films—which darken in response to bright light, and lighten in response to low levels of light—like those used for "transitional" eyeglass lens.

Advantageously, Z Ray technology offers motorists the following important benefits:

Driving Safety: The Z Ray yellow or amber tint dramatically reduces potentially dangerous glare from sunlight, reflected light from snow or rain, and the headlights of oncoming vehicles, improving a driver's vision of the roadway, obstacles, and other vehicles and pedestrians.

Accident Protection: The Z Ray's sandwiched tint-film would act to hold shattering laminated glass together effectively, increasing occupant safety in crashes.

Skin Protection: The Z Ray glass effectively blocks a vast majority of potentially harmful UV rays in sunlight. Since UV rays also damage a wide range of natural and synthetic materials, from a vehicle's dashboard to its upholstery, the Z Ray glass protects and extends the life of the vehicle's interior.

Temperature Control: The Z Ray technology would keep the interior of a vehicle cooler on hot, sunny days. In Boats and Aircraft, the Z Ray glass would cut down glare and heat, and offer better vision on bright days, and clear vision at night. The Z Ray is cost-effective to produce in the embodiments, as shown in FIGS. 1-5.

Figure 2:
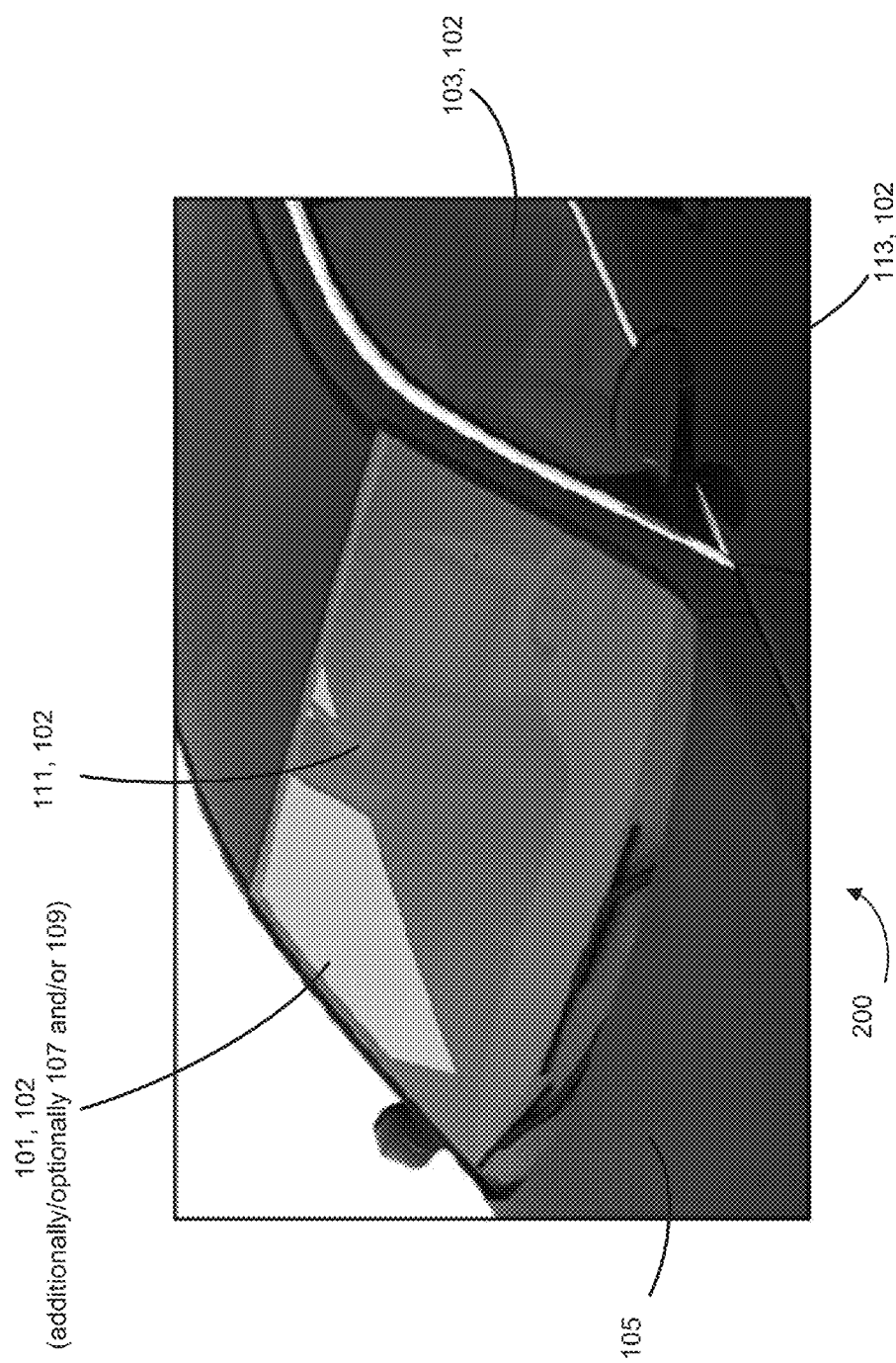
FIG. 2 is a perspective view illustrating an improved motor vehicle window visibility system as a product installed on a motor vehicle according to an embodiment of the present invention of FIG. 1.

Referring now to FIG. 2, a perspective view illustrates the improved motor vehicle window visibility system as a product installed on a motor vehicle according to an embodiment of the present invention of FIG. 1.

Figure 3:
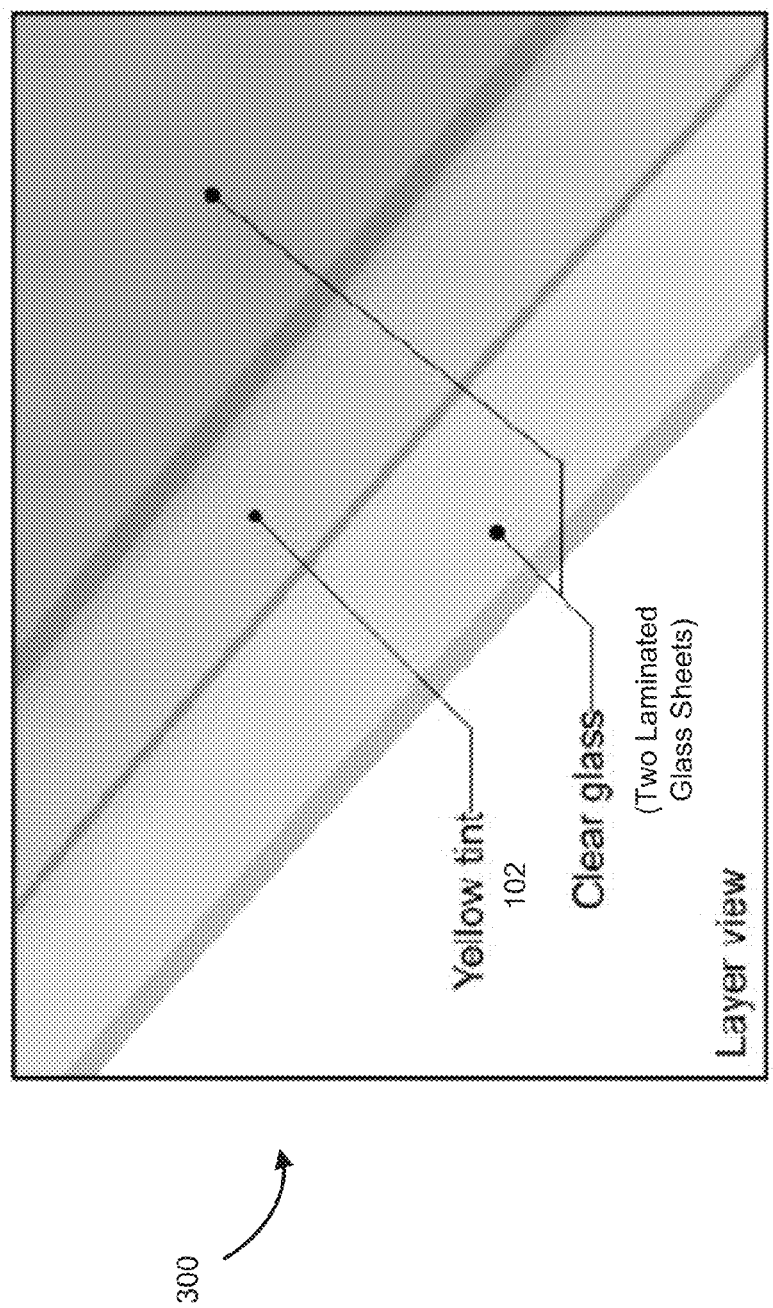
FIG. 3 is a perspective view illustrating thin polymeric film of an improved motor vehicle window visibility system according to an embodiment of the present invention of FIG. 1.

Referring now to FIG. 3, a perspective view illustrates a thin polymeric film according to an embodiment of the present invention of FIG. 1.

Figure 4:
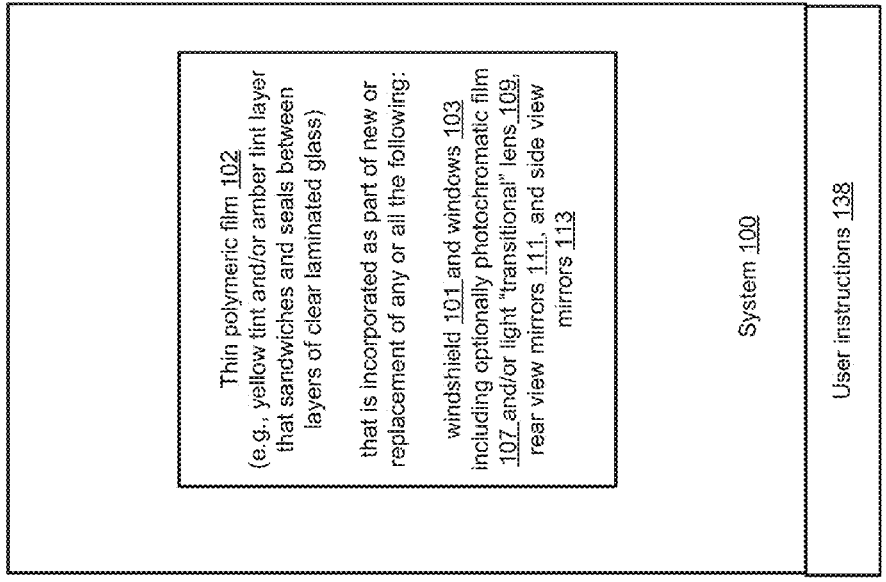
FIG. 4 is a kit illustrating an improved motor vehicle window visibility system according to an embodiment of the present invention of FIG. 1.

FIG. 4 is a kit illustrating the improved motor vehicle window visibility system according to an embodiment of the present invention of FIG. 1.

Referring now to FIG. 4, showing improved motor vehicle window visibility system 100. Improved motor vehicle window visibility system 100 may be sold as a replacement glass or original motor vehicle glass kit 400 comprising: at least one thin polymeric film 102 sandwiched between two laminated glass sheets, e.g., including optionally photochromic film 107 and/or light "transitional" lens 109 that include dimensionality of at least one of the following items: the windshield 101, the windows 103, at least one rearview mirror 111, and at least one side mirror 113; and at least one set of user instructions 138. The kit has instructions such that functional relationships are detailed in relation to the structure of the invention (such that the invention can be used, maintained, or the like in a preferred manner). System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
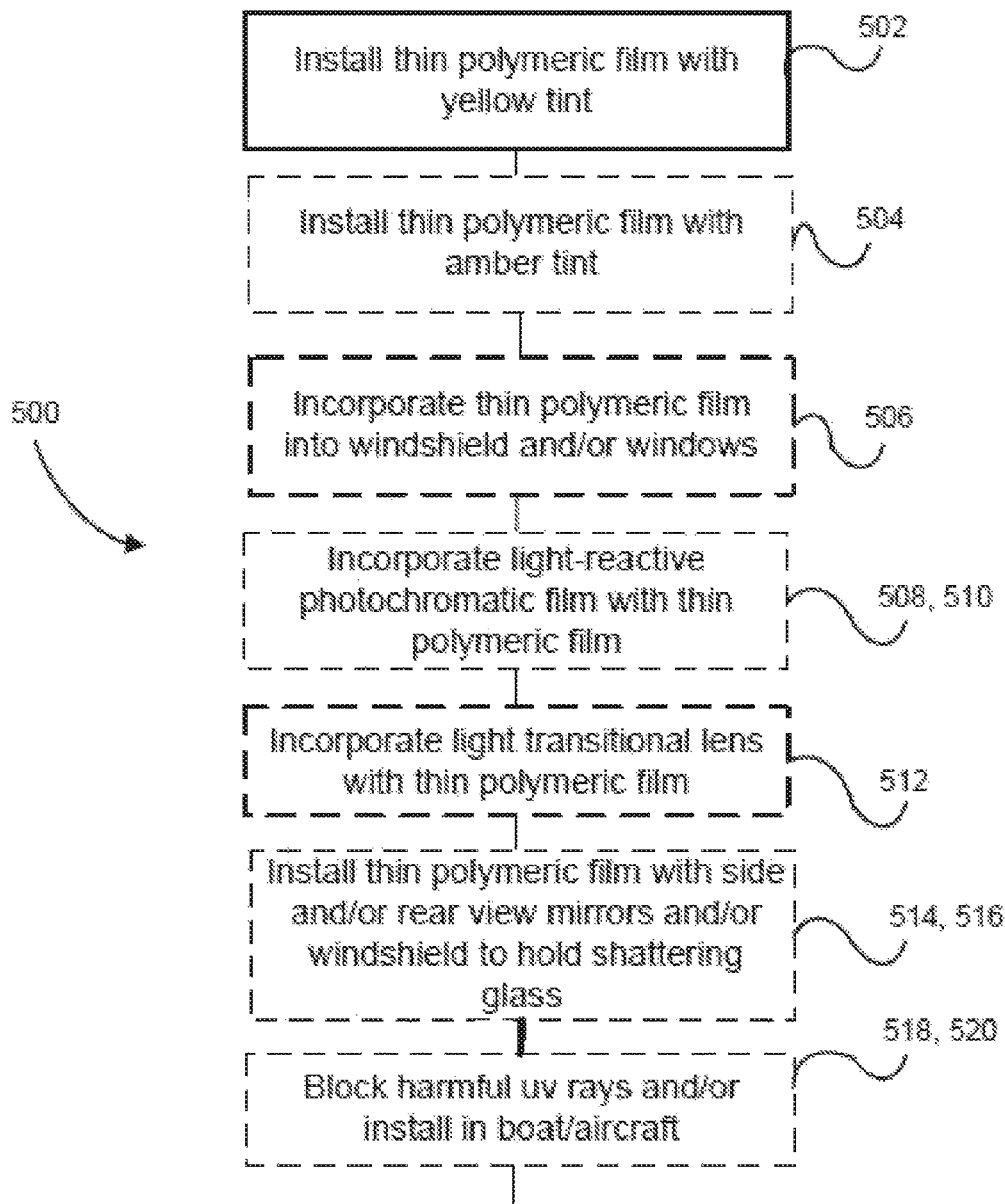
FIG. 5 is a flowchart illustrating a method of use for an improved motor vehicle window visibility system according to an embodiment of the present invention of FIGS. 1-4.

FIG. 5 is a flowchart illustrating a method of use for an improved motor vehicle window visibility system according to an embodiment of the present invention of FIGS. 1-4.

Referring now to FIG. 5, an improved motor vehicle window visibility method is disclosed that increases visibility and provides low-glare for windshield 101 and windows 103 of a motor vehicle 105, and improves visual contrast and reduces glare in bright sunlight, rain, sleet, snow, fog, and night conditions. In step 502, install a thin polymeric film 102 that sandwiches between layers of clear laminated glass of the motor vehicle 105. In one example, the thin polymeric film 102 is yellow-tinted. In step 504, install the thin polymeric film 102 includes an amber tint to further improve contrast and enhance visibility in the bright sunlight, rain, sleet, snow, fog, and night conditions. In step 506, incorporating the thin polymeric film 102 into a design and production between the layers of the clear laminated glass of the windshield 101 and/or the windows 103 of the motor vehicle 105. In step 508, incorporate into a production of light-reactive photochromic film 107 the thin polymeric film 102 between the layers of the clear laminated glass of the windshield 101 and/or the windows 103 of the motor vehicle 105.

In step 510, incorporate the thin polymeric film 102 with a light-reactive photochromic film 107 that darkens in response to bright light and lightens in response to low levels of light. In step 512, incorporate the thin polymeric film 102 with light transitional lenses 109 in the windshield 101. In step 514, install the thin polymeric film 102 includes incorporating the thin polymeric film 102 between the layers of the clear laminated glass of a rear view mirror 111 and/or side view mirrors 113 of the motor vehicle 105. In step 516, dispose the thin polymeric film 102 within the windshield 101 and/or the windows 103 securely hold shattering laminated glass together to increase occupant safety with the motor vehicle 105 in an event of shattering during a car crash or a window breaking of the windshield 101 and/or the windows 103.

In step 518, the thin polymeric film effectively blocks a vast majority of potentially harmful UV rays in sunlight, prevents occupants' skin damage, and protects a wide range of natural and synthetic materials including a vehicle's dashboard 113 and a vehicle's upholstery 115. In step 520, the motor vehicle 105 includes a boat and an aircraft and wherein the thin polymeric film 102 provides temperature control for an interior of the motor vehicle 105 so that the motor vehicle 105 remains cooler on hot days and cuts down on glare and heat.

It should be noted that step(s) 504-520 is/are optional step(s) and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as user preferences, design preference, structural requirements, marketing preferences, cost, available materials, technological advances, etc., other window visibility arrangements such as, for example, thin polymeric films, thin polymeric coatings, thin polymeric depositions, thin polymeric spraying, between layers of glass etc., may be sufficient.

Those with ordinary skill in the art will now appreciate that upon reading this specification and by their understanding the art of motor vehicle widow visibility as described herein, methods of motor vehicle window visibility will be understood by those knowledgeable in such art.

What is claimed is new and desired to be protected by Letters Patent is set forth in the appended claims:

1. An improved motor vehicle window visibility system that increases visibility, provides low-glare for at least one of a windshield and windows of a motor vehicle, improves temperature control, improves visual contrast and reduces glare in bright sunlight, rain, sleet, snow, fog, and night conditions, the system comprising:
   a thin polymeric film, yellow-tinted, that sandwiches and seals between layers of clear laminated glass of the at least one of the windshield and the windows of the motor vehicle.

2. The system of claim 1, wherein the thin polymeric film further includes an amber tint to further improve contrast and enhance visibility in the bright sunlight, rain, sleet, snow, fog, and night conditions.

3. The system of claim 1, wherein the thin polymeric film is installed and incorporated into a design and a production between the layers of the clear laminated glass for the at least one of the windshield and the windows of the motor vehicle.

4. The system of claim 1, wherein the thin polymeric film is installed and incorporated into a production of light-reactive, photochromic film between the layers of the clear laminated glass of the at least one of the windshield and the windows of the motor vehicle.

5. The system of claim 1, wherein the thin polymeric film includes a light-reactive photochromic film that darkens in response to a bright light and lightens in response to low levels of light.

6. The system of claim 1, wherein the thin polymeric film is installed and incorporated in a light "transitional" lens between the layers of the clear laminated glass of the windshield.

7. The system of claim 1, wherein the thin polymeric film is installed and incorporated between the layers of the clear laminated glass of at least one of a rear view mirror and side view mirrors of the motor vehicle.

8. The system of claim 1, wherein the thin polymeric film is disposed and positioned within the at least one of the windshield and the windows to hold shattering laminated glass together to increase occupant safety within the motor vehicle in an event of shattering during a car crash or a window breaking of the at least one of the windshield and the windows.

9. The system of claim 1, wherein the thin polymeric film effectively blocks a vast majority of potentially harmful UV rays in sunlight, prevents occupants' skin damage, and protects a wide range of natural and synthetic materials including a vehicle's dashboard and a vehicle's upholstery.

10. The system of claim 1, wherein the motor vehicle includes a boat and an aircraft and wherein the thin polymeric film provides temperature control for an interior of the motor vehicle so that the motor vehicle remains cooler on hot days and cuts down on glare and heat.

11. A method for improving motor vehicle window visibility that increases visibility, provides low-glare for at least one of a windshield and windows of a motor vehicle, improves temperature control and visual contrast, and reduces glare in bright sunlight, rain, sleet, snow, fog, and night conditions, the method comprising:
   installing a thin polymeric film, yellow-tinted, that sandwiches and seals between layers of clear laminated glass of the motor vehicle.

12. The method of claim 11, comprising installing the thin polymeric film that includes an amber tint to further improve contrast and enhance visibility in the bright sunlight, rain sleet, snow, fog, and night conditions.

13. The method of claim 11, comprising incorporating the thin polymeric film into a design and production between the layers of the clear laminated glass of the at least of the windshield and the windows of the motor vehicle.

14. The method of claim 11, comprising incorporating the thin polymeric film with a production of light-reactive photochromic film between the layers of the clear laminated glass of the at least one of the windshield and the windows of the motor vehicle.

15. The method of claim 11, comprising incorporating the thin polymeric film with a light-reactive photochromic film that darkens in response to a bright light and lightens in response to low levels of light.

16. The method of claim 11, comprising incorporate the thin polymeric film with light transitional lens in the windshield.

17. The method of claim 11, comprising installing the thin polymeric film that includes incorporating the thin polymeric film between the layers of the clear laminated glass of at least one of a rear view mirror and side view mirrors of the motor vehicle.

18. The method of claim 11, disposing the thin polymeric film within the at least one of the windshield and the windows that securely hold shattering laminated glass together to increase occupant safety within the motor vehicle in an event of shattering during a car crash or a window breaking of the at least one of the windshield and the windows.

19. The method of claim 11, wherein the thin polymeric film effectively blocks a vast majority of potentially harmful UV rays in a sunlight, prevents occupants' skin damage, and protects a wide range of natural and synthetic materials including a vehicle's dashboard and a vehicle's upholstery.

20. The method of claim 11, wherein the motor vehicle includes a boat and an aircraft, and wherein the thin polymeric film provides temperature control for an interior of the motor vehicle so that the motor vehicle remains cooler on hot days and cuts down on glare and heat.

* * * * *